United States Patent [19]

Yerkes et al.

[11] Patent Number: 4,928,257
[45] Date of Patent: May 22, 1990

[54] METHOD AND APPARATUS FOR MONITORING THE THICKNESS PROFILE OF A STRIP

[75] Inventors: James E. Yerkes; Theodore H. Lethen, both of Valparaiso, Ind.

[73] Assignee: Bethlehem Steel Corporation, Bethlehem, Pa.

[21] Appl. No.: 147,895

[22] Filed: Jan. 25, 1988

[51] Int. Cl.⁵ .................. G01B 15/02; G01B 15/04
[52] U.S. Cl. .................. 364/563; 364/575; 364/472; 250/360.1; 378/54
[58] Field of Search ............ 364/562, 563, 472, 582, 364/575; 378/54, 55, 56; 250/360.1

[56] References Cited

U.S. PATENT DOCUMENTS

| | | | |
|---|---|---|---|
| 3,936,665 | 1/1976 | Donoghue | 364/469 |
| 4,037,104 | 7/1977 | Allport | 378/54 |
| 4,047,036 | 9/1977 | Smith et al. | 378/56 |
| 4,088,886 | 5/1978 | Moulton | 378/56 |
| 4,240,147 | 12/1980 | Morooka et al. | 364/472 |
| 4,398,254 | 8/1983 | Kondo et al. | 364/563 |
| 4,435,643 | 3/1984 | Junck | 378/55 |
| 4,510,577 | 4/1985 | Tsujii et al. | 364/563 |
| 4,542,297 | 9/1985 | Hold | 250/360.1 |
| 4,549,306 | 10/1985 | Shideler et al. | 378/56 |
| 4,551,805 | 11/1985 | Shimoda et al. | 364/472 |
| 4,574,387 | 3/1986 | Gignoux et al. | 378/56 |
| 4,633,420 | 12/1986 | Masanobu | 364/563 |
| 4,759,046 | 7/1988 | Kopineck et al. | 378/54 |
| 4,777,610 | 10/1988 | Barwick et al. | 364/561 |
| 4,799,177 | 1/1989 | Sarr | 364/563 |

Primary Examiner—Parshotam S. Lall
Assistant Examiner—Christopher L. Makay
Attorney, Agent, or Firm—Shlesinger & Myers

[57] ABSTRACT

A method of monitoring the thickness of a longitudinally moving strip to permit quick detection of continuous defects includes the steps of scanning the strip a predetermined number of times measuring the thickness at a plurality of sites across the strip width for thereby generating a plurality of data sets, or scans, with each data set indicative of the thickness profile of the strip. The scans are smoothed by combining the data sets and thereby generating a single representative profile. Additional profiles are generated and displayed in three dimensional format so that a plurality of profiles in sequential relation are continuously displayed to permit a continuous defect, when occurring, to be detected and displayed from at least one profile to an immediately subsequent profile.

20 Claims, 4 Drawing Sheets

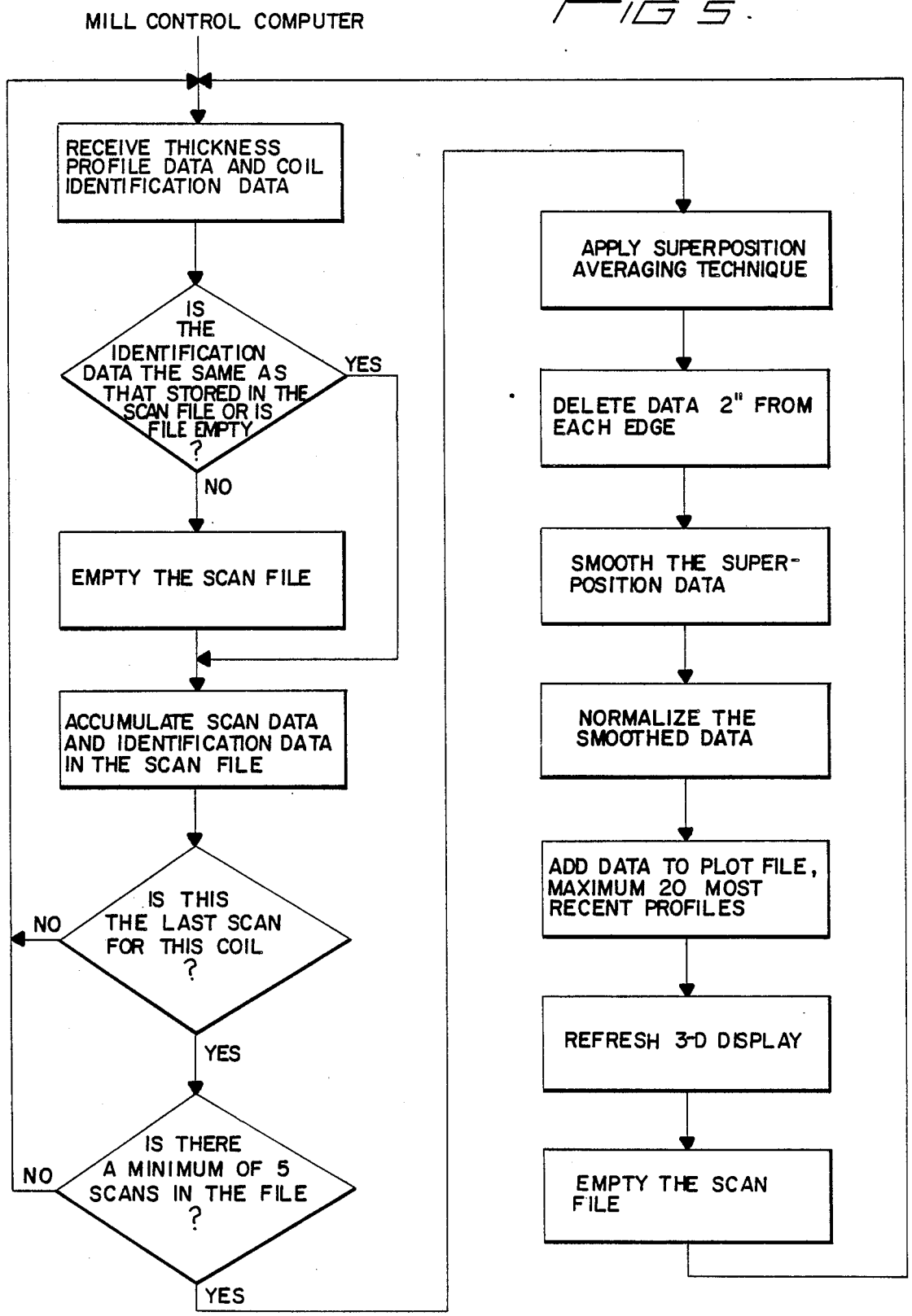

METHOD AND APPARATUS FOR MONITORING THE THICKNESS PROFILE OF A STRIP

BACKGROUND OF THE INVENTION

Steel strip is customarily finished by rolling operations conducted in a number of rolling mills. Typically, the steel is rolled in a hot strip mill to a specified thickness and then sent to a cold mill for further reduction. The strip rolled in the hot mill normally is produced with a profile or crown, so that the strip is relatively thick at the center and progressively thins towards the edges. Those skilled in the art will understand that a continuous defect, or localized change in the profile, occurring in the hot mill could well have the effect of being carried through to the cold mill, thereby producing unusable product which already has the finishing cost built in.

The profile of a strip is a measure or indicator of the relative thickness achieved in the hot strip mill finishing operation. Monitoring of the profile is one means of assuring that the mill is satisfactorily producing steel strip of the required dimensional parameters. Numerous devices have been proposed for monitoring the strip profile, but these prior monitoring techniques have not been totally satisfactory. It should be noted that the occurrence of a single or point defect is relatively unimportant, whereas a continuous defect is of substantial importance because one or more strips may therefore be rendered unusable. The prior techniques have, to our knowledge, been more concerned with display of a single profile and detect, rather than through display of several profiles indicating a continuous detect.

In view of the above, it can be seen that there is a need for a method and apparatus permitting continuous defects to be detected through monitoring of the strip profile. Such a system should permit easy detection of continuous defects, either by the mill operator or, advantageously, through a computer analysis mechanism. The disclosed invention is just such a method and apparatus which is based upon three dimensional computer imaging utilizing data smoothing techniques applied to a finite number of strip profiles.

OBJECTS AND SUMMARY OF THE INVENTION

The primary object of the disclosed invention is a method and apparatus for permitting continuous defects in a steel strip to be detected through utilization of three dimensional imaging applied to strip profiles developed through conventional X-ray gauge scanning techniques.

A method of monitoring the profile of longitudinally moving strip material to permit quick detection of continuous defects includes the steps of scanning a strip a predetermined number of times for capturing strip thickness at a plurality of sites across the strip width so that a plurality of data sets or scans are developed, each data set containing data indicative of the thickness profile. The scans are smoothed by combining the data sets so that a single profile is generated. Multiple profiles are displayed in a three dimensional format. A plurality of profiles are continuously displayed in sequential relation so that the occurrence of a continuous defect will be displayed from one profile to at least an immediately subsequent profile.

An apparatus for monitoring the profile of a moving strip comprises first and second scanners and associated profile computer, with one of the scanners disposed along the center of the strip to be monitored and the other of the scanners movable transverse to the strip and each of the scanners generating data indicative of the thickness of the strip moving relative thereto. A second computer means is operably associated with the scanners and profile computer for receiving the data and includes first means for averaging the data generated by the profile computer during a plurality of traverses of the strip, second means for smoothing and normalizing the averaged profiles for thereby creating a profile indicative of the relative thickness of the strip and third means for generating the profile into a three dimensional pattern. A display means is operably associated with the computer means for displaying a plurality of profiles in sequential relation so that a continuous defect extending from one profile to an immediately subsequent profile can be detected.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 4:
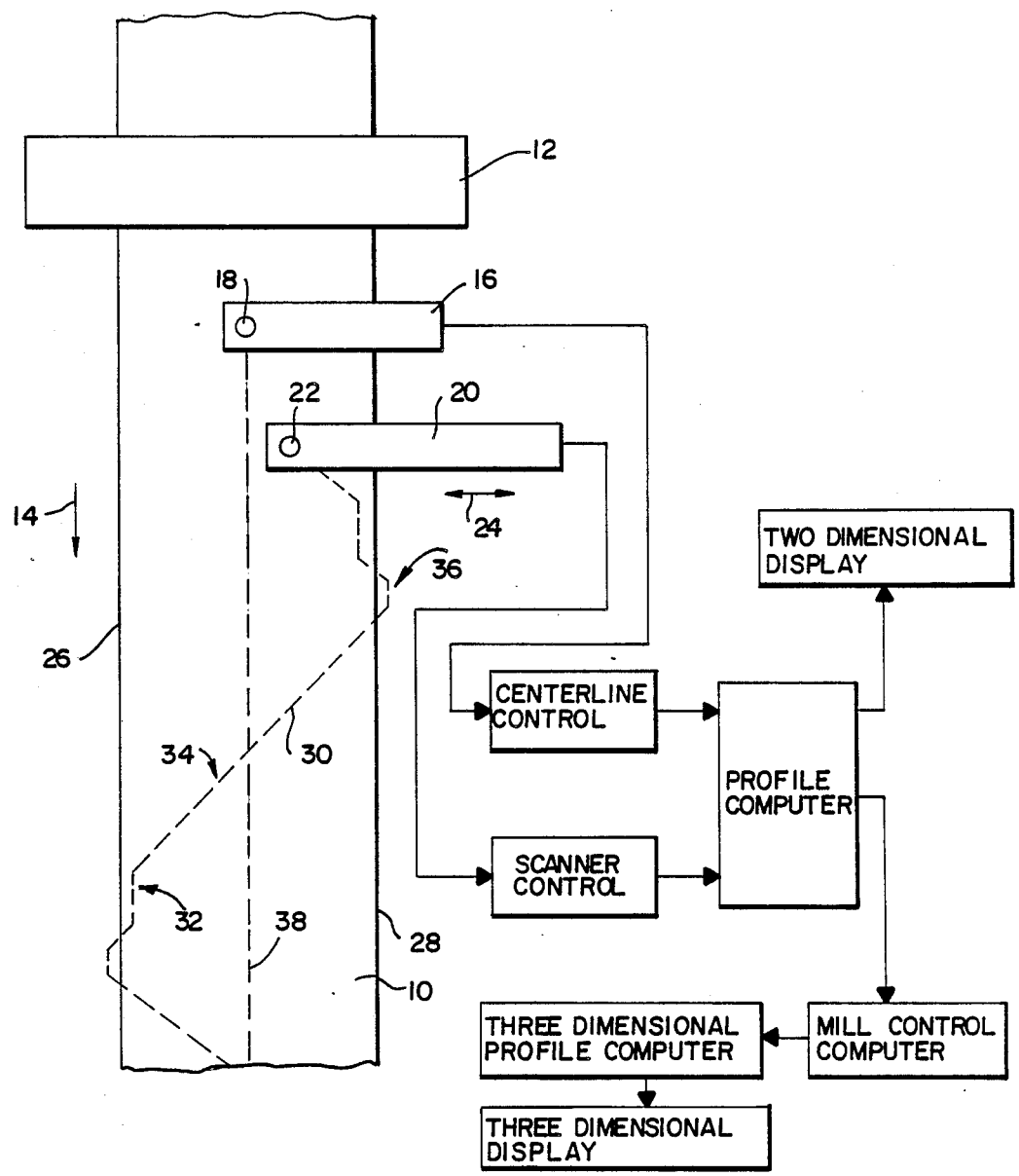
FIG. 4 is a schematic view illustrating the apparatus of the invention as applied to a hot strip mill; and, FIG. 5 is a flow chart illustrating the processing system utilized to generate the three dimensional images.

Steel strip 10, as best shown in FIG. 4, has proceeded through roller reduction system 12 in the direction indicated by arrow 14. Those skilled in the art will understand that a further roller assembly or coiler would normally be located downstream of roller system 12 in a conventional hot strip mill. Furthermore, a number of roller systems 12 would normally be provided as the steel strip 10 was progressively reduced to the required physical dimensions. Naturally, the invention is not limited to use in the hot strip mill, but may be used in similar installations and for other than the rolling of steel.

X-ray gauge or scanner 16 is disposed on the centerline of strip 10 and generates data indicative of the thickness of the strip 10 along the centerline thereof. The gauge or scanner 16 is of conventional design and generates data indicative of the strip thickness, which data is normally in analog form and should be converted to digital form for further processing by a computer system. The scanner 16 has an X-ray source 18 on one side of strip 10 and a detector or detectors (not shown) on the other side for interpreting the intensity of the beam generated by the source 18. The data generated by scanner 16 forms a first data set indicative of the centerline thickness.

A similar X-ray gauge or scanner 20 is positioned downstream of scanner 16 and likewise has an X-ray source 22 which cooperates with a detector or detectors (not shown). The scanner 20 is movable, however, transverse to the longitudinal axis of the strip 10, as indicated by the arrow 24. The scanner 20 generates data indicative of the thickness of the strip 10 as the scanner 20 moves across the strip 10 between the edges 26 and 28 thereof. We prefer that the data be collected at a plurality of sites of predetermined location in view of the need to otherwise utilize plural detectors. The data generated by scanner 20 forms a second data set indicative of the strip thickness at each of the sites.

The dashed line 30 of FIG. 4 illustrates the effective path of the scanner 20 across the strip 10. The dashed line 30 has a first portion 32 extending parallel to the edges 26 and 28 of strip 10, in order to permit certain data to be collected for use by the profile computer system. A second portion 34 represents the traverse of the scanner 20 across the strip 10, and between the edges 26 and 28, by which the data indicative of the thickness across the strip is generated. The third portion 36 represents the change in direction of the scanner 20 once one of the edges 26 and 28 has been detected, after which the process then begins again. The dashed line 38 represents the centerline of strip 10 along which the scanner 16 operates.

The scanner 16 is operably connected to the centerline control system by suitable wiring and the like. Similarly, traversing scanner 20 is operably connected to the traversing scanner control system by similar wiring. The centerline and scanner control systems both are connected to the profile computer which feeds relevant data to a conventional two dimensional display and to the mill control computer. The mill control computer feeds relevant data to the three dimensional profile computer, which likewise is operably connected with a three dimensional operator display.

Those skilled in the art will understand that the variations in centerline thickness of the strip is of little importance when detection of continuous defects in the profile is desired. Rather, the relative thickness of the strip is important when monitoring the profile because the relative thickness provides the indication of the crown. For this reason, the data developed by the centerline scanner 16 is considered to be the base point against which the data from the traversing scanner 20 is compared. In other words, the difference between the thickness measured by the traversing scanner 20 with regard to the centerline scanner 16 provides the indication of the crown, and is useful for generating a profile which can be readily assimilated without regard to absolute thickness.

Figure 3:
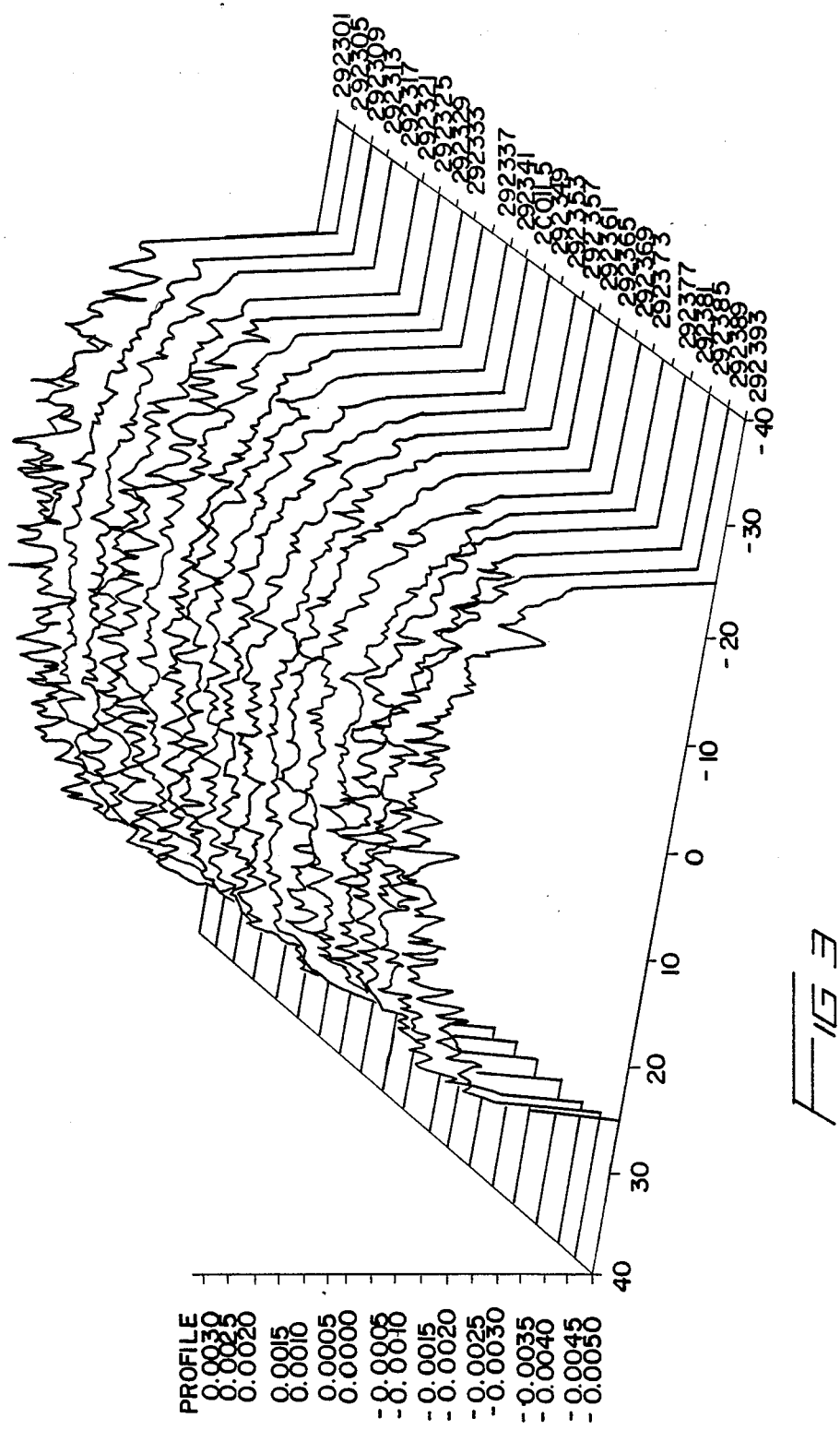
FIG. 3 is a view similar to that of FIGS. 1 and 2 but illustrating raw data which has not been smoothed pursuant to the invention.

FIG. 3 illustrates a three dimensional display, much as would be shown on the three dimensional display of FIG. 4, with raw, non-smoothed data. It can be seen that the profiles displayed in FIG. 3 are incapable of satisfactory utilization in detecting continuous defects. We believe that the raw data contains much noise generated by movement of the strip 10, movement of the scanner 20, as well as noise inherent in the various pieces of equipment themselves. For this reason, it is necessary to eliminate the noise in order to provide a display which can be useful in detecting defects.

FIG. 5 illustrates the system developed to eliminate the noise and provide useful graphical information for permitting defects to be detected. Naturally, the flow chart of FIG. 5 is programmed into a modern digital computer capable of performing the necessary calculations with the speed required to provide real time information. Real time information is important if defective coils are to be detected and mill corrections made to prevent further production of defective coils. Similarly, identification of a non-conforming coil in the hot strip mill can be used to permit that coil to be diverted to a lesser grade of material, thereby not totally wasting the prior finishing steps. As such, the three dimensional display patterns provided by the invention are an effective cost reducing tool.

The three dimensional profile computer of FIG. 4 first receives the scan data from the mill control computer, as well as certain coil identification data. This assures that the scan information is correlated with the appropriate coil, because we have found it necessary for a minimum number of scans to be collected to generate accurate profile information. Furthermore, it is important that the profile data be correlated with a particular coil because the mill may be processing various coils, each with its own physical dimensions, and each thereby having its own specifications.

Should the three dimensional profile computer determine that the identification data is not that of the strip of the previous scan, then the scan file is emptied in order to permit data to be accumulated. If the coil identification data is the same, then the scan data from the mill control computer is accumulated. After the data for a particular scan has been accumulated, then the three dimensional profile computer makes inquiry as to whether that was the last scan for that particular coil. If not, then the data accumulation process is again begun.

Should the previous scan have been the last scan for that particular coil, then the three dimensional profile computer queries whether at least five scans have been accumulated in the scan file. We have found that the scan data can be satisfactorily smoothed, as will be explained, if at least five scans are accumulated in the scan file. Should fewer than five scans be accumulated, then satisfactory smoothing is not achieved. Similarly, we see little substantive increase in utilizing more than five scans, although such may be appropriate in certain situations. Assuming that five scans have been accumulated in the scan file, then the three dimensional profile computer averages the data for those five scans and thereby generates a single averaged data set.

Those skilled in the art will understand that the traversing scan data actually represents a series of data points disposed across the width of the strip 10, each point corresponding to a particular location along the dashed line 30. We have found that it is adequate for the data points to be located approximately one half inch apart, because the typical continuous defect will have a width in excess of one half inch. Therefore, positioning the data points one half inch apart will assure that a continuous defect along the strip length, if present, will be detected.

Averaging the data accumulated from each scan is one effective data smoothing tool after the minimum number of scans have been completed. After the data averaging has been accomplished, then we have found it advantageous to delete the data for those points which are within a predetermined distance of the edges 26 and 28 of the strip 10. We have found it appropriate to delete the data for those points which are within two inches of each edge because such data is subject to numerous influences not attributable to a continuous defect in the mill and the like.

After the edge data has been deleted, then a further smoothing technique is used by combining the data from adjacent points along the profile. We have found that a two inch running filter helps to smooth out the data for each point. In other words, the data for the point located at inch 20 is averaged with the data for those points occurring within ±1 inch of inch 20. This process is repeated across the width of the strip for the remaining sites. The running averaged data helps to further smooth out the data and eliminate the effects of noise.

After the running averaged data has been generated, then we normalize the smoothed data by setting the centerline of the strip data to zero and adjusting all other points by an amount equal to the change made to the centerline data. The result is that all profiles in the three dimensional display are referenced to the same centerline data with a value of zero, and the traverse data is referenced to the correlated centerline data.

After the data has been normalized, then the data is added to a plot file which refreshes the three dimensional display. We have found that continuous display of 20 profiles is adequate for permitting detection of a continuous defect. Should there be a continuous defect, such as would be caused by a mill problem, then a trend should develop across these sequentially arranged 20 profiles. Naturally, as the twenty-first profile is generated, then the first profile is deleted and the prior profiles are moved in relation thereto.

After the three dimensional display is refreshed with the most recent profile, then the scan file is emptied and the three dimensional profile computer once again receives thickness profile scan data and coil identification data.

Figures 1, 2:
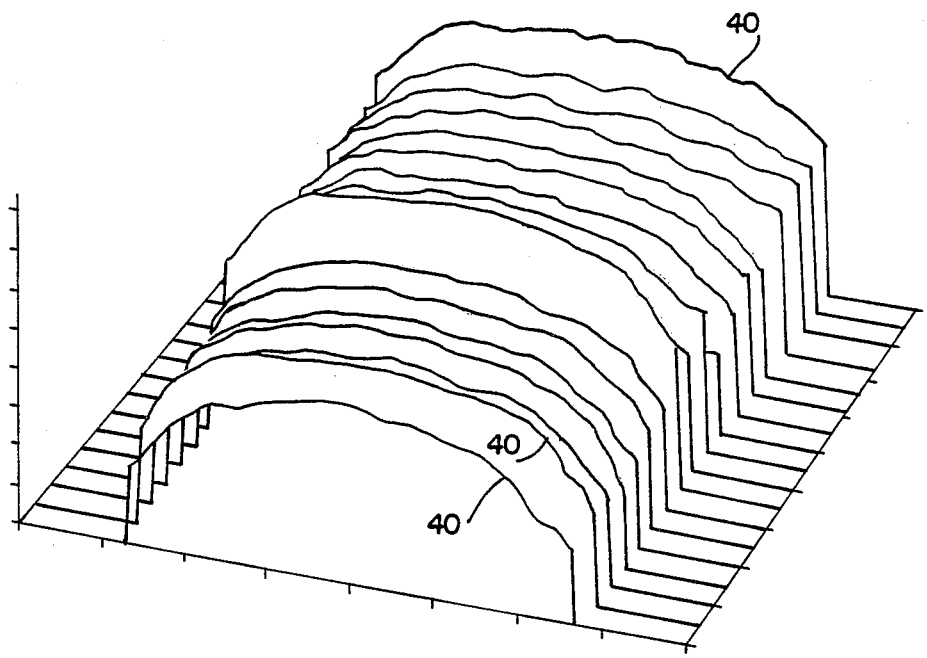
FIG. 1 is a view illustrating the three dimensional sequential profiles displayed pursuant to the invention.
FIG. 2 is a view similar to that of FIG. 1 but illustrating a continuous defect occurring from one profile to the next.

FIG. 1 discloses a three dimensional display as would be provided on the three dimensional display of FIG. 4. Those skilled in the art will understand that the three dimensional display of FIG. 4 can be a conventional cathode ray tube system or the like.

It can be noted in FIG. 1 that the displayed profiles, in three dimensional form, show no repetitive pattern or irregularity from one profile to the next. As such, the profiles 40 indicate that there is no recurring irregularity which needs to be corrected.

The profiles 42 of FIG. 2, on the other hand, do indicate a recurrent irregularity 44 occurring from the first, or closest of the profiles of FIG. 2, to later subsequent profiles. This recurrent irregularity 44, which creates a "ridge" defect in the product when reduced in the cold mill operation, is indicative of a mill problem which must be corrected. Failure to correct the problem causing the irregularity 44 means that each subsequent coil will, most likely, have the same problem.

Those skilled in the art will understand that an irregularity, such as the irregularity 44, is a defect in the strip 10 which can be caused by a localized increase in the thickness profile. X-ray gauges, such as the scanners 16 and 20, can measure the thickness profile but a conventional two dimensional graphical display of the profile data does not easily permit continuous defects to be detected. Manipulating the profile data, as previously explained, removes noise and results in the generation of profile information which the operator can view in order to easily ascertain the presence of a continuous defect. Previous single profile display systems, on the other hand, did not permit such ready detection because information was provided for only one scan, thereby preventing a continually occurring defect from being detected.

Those skilled in the art will understand that the disclosed invention relates to a method for manipulating and displaying thickness profile data in a manner permitting the presence of a continuous irregularity in the strip profile to be detected. This irregularity is easily detected because of the three dimensional patterns. The data is generated by the strip profiling system, and consists of one or more scans per coil which are logged digitally, at some uniform interval across the strip width. We have found that a minimum of five scans should be superimposed or averaged to help smooth the data. The scans can all be from one coil or from sequentially rolled coils of the same composition, thickness and width. The resultant superimposed scan is then further filtered by a two inch running average filter. Scans from consecutive coils can then be displayed in a three dimensional array with appropriate spacing between the scans.

On-line indication of a localized variation in the strip thickness profile provides the mill operator with real time detection, and the opportunity to react by identifying and correcting the cause of the irregular profile. The three dimensional pattern is displayed on a convention CRT display, and may also be provided in hard copy for archival purposes.

While this invention has been described as having a preferred design, it is understood that it is capable of further modifications, uses and/or adaptations following the general principle of the invention and including departures coming within known or customary practice in the art to which the invention pertains and as may be covered by the claims appended hereto.

We claim:

1. The method of monitoring the thickness of longitudinally moving strip material to permit quick detection of continuous defects, comprising the steps of:
   (a) scanning a strip a predetermined number of times at a plurality of sites across the strip and thereby generating a plurality of data sets with each set indicative of the thickness of the strip across the width thereof:
   (b) smoothing the scans by combining the data sets and thereby generating a profile;
   (c) displaying the generated profile in a two dimensional format; and,
   (d) repeating steps a through c and thereby continuously displaying a plurality of profiles in sequential relation so that the displayed profiles assume a three dimensional format and a continuous defect, upon the occurrence thereof, will be displayed from one profile to at least an immediately subsequent profile.

2. The method of claim 1, including the step of:
   (a) scanning the strip at a plurality of locations along the strip width.

3. The method of claim 2, including the step of:
   (a) scanning the strip and measuring the thickness at a plurality of sites which are spaced apart a distance less than the width of a defect to be detected.

4. The method of claim 1, including the step of:
   (a) scanning an edge portion of the strip prior to scanning across the width of the strip.

5. The method of claim 1, including the steps of:
   (a) scanning the strip with a first scanner positioned substantially equidistant the edges of the strip and thereby generating a first thickness data set;

(b) scanning the strip with a second scanner movable across the strip from one edge to the other and thereby generating a second thickness data set; and, (c) comparing the second thickness data set with the first thickness data set and thereby generating a data set of relative strip thickness.

6. The method of claim 1, including the step of:
(a) further smoothing the scans by averaging the data for each site with the data for the immediately adjacent sites.

7. The method of claim 5, including the step of:
(a) further smoothing the scans by averaging the data for each site with the data for the immediately adjacent sites.

8. The method of claim 1, including the step of:
(a) generating the plurality of profiles over the length of at least two strips, the strips being of substantially uniform composition, thickness and width.

9. The method of claim 1, including the step of:
(a) scanning the strip at least five times so that at least five data sets are generated.

10. The method of claim 1, including the step of:
(a) displaying a plurality of profiles at any given time and advancing the displayed profiles as each subsequent profile is generated.

11. The method of detecting continuous defects in a moving steel strip, comprising the steps of:
(a) providing a steel strip moving longitudinally therealong;
(b) scanning the center of the strip and thereby generating a first data set indicative of the thickness of the strip at the center thereof;
(c) scanning the strip a plurality of times at a plurality of sites across the width of the strip and thereby generating a plurality of second data sets, each second data set indicative of the thickness of the strip across the width thereof;
(d) smoothing the second data sets by averaging the second data sets together and thereby obtaining a composite data set;
(e) comparing the composite data set with the first data set and thereby generating a profile indicative of the relative thickness of the strip;
(f) displaying the generated profile in three dimensional format; and,
(g) repeating steps a through f and thereby continuously displaying a plurality of profiles in sequential relation so that a defect, upon occurrence thereof, will be displayed from one profile to at least the immediately subsequent profile.

12. The method of claim 11, including the step of:
(a) smoothing the composite data set by averaging the data for each site with the data for a predetermined number of sites on either side thereof.

13. The method of claim 11, including the step of:
(a) scanning the strip at a plurality of sites which are uniformly spaced apart.

14. The method of claim 11, including the step of:
(a) scanning the strip and measuring the thickness at a plurality of sites which are spaced apart a distance less than the width of a defect to be detected.

15. The method of claim 11, including the step of:
(a) scanning the strip at least five times to generate the composite data set.

16. The method of claim 11, including the steps of:
(a) scanning the strip from one edge to another while generating the second data sets; and,
(b) deleting from the composite data set data for each profile which is within a predetermined distance of each of the edges.

17. The method of claim 11, including the steps of:
(a) displaying a plurality of profiles at any given time; and,
(b) sequentially advancing the displayed profiles as each new profile is generated.

18. The method of claim 11, including the step of:
(a) ascertaining the identity of the strip scanned and generating the composite data set.

19. Apparatus for monitoring the profile of a moving strip, comprising:
(a) first and second scanners, one of said scanners for being disposed along the center of a strip to be monitored and the other of said scanners for being movable transverse to the strip and each of said scanners for generating data indicative of the thickness of a strip moving relative thereto;
(b) computer means operably associated with each of said scanners for receiving the generated data and including first means for averaging the data generated by said other scanner during a plurality of traverses of the strip, second means for comparing the averaged data with the data generated by said one scanner and for thereby generating a profile indicative of the relative thickness of the strip and third means for generating the profile into a three dimensional pattern; and,
(c) display means operably associated with said computer means for displaying a plurality of patterns so that a continuous defect extending from one pattern to an immediately subsequent pattern can be detected.

20. The apparatus of claim 19, wherein said first means includes:
(a) a first digital computer means operably associated with said scanners for receiving and averaging the data; and said second means includes;
(b) a second computer means for generating the pattern and for transmitting the generated pattern to said display means.

* * * * *